3,207,785
N-(2-PHENYLCYCLOPROPYL) FORMAMIDES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Jan. 17, 1963, Ser. No. 252,039
3 Claims. (Cl. 260—562)

This application is a continuation-in-part of Serial No. 62,859 filed October 17, 1960, now U.S. Patent 3,106,576.

This invention relates to novel N-(2-phenylcyclopropyl)-formamides having valuable therapeutic activity. These compounds are useful as antidepressant agents having potent monoamine oxidase inhibiting activity together with a low order of toxicity.

The novel compounds of this invention are represented by the following structural formula:

FORMULA I

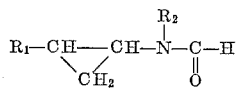

when:

$R_1$ represents phenyl, chlorophenyl, fluorophenyl, trifluoromethylphenyl, lower alkylphenyl, dichlorophenyl or di-lower alkylphenyl; and $R_2$ represents hydrogen or lower alkyl.

Advantageous compounds of this invention which are particularly potent tryptamine potentiating agents are represented by the following formula:

FORMULA II

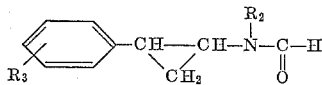

when:

$R_2$ represents hydrogen or methyl and
$R_3$ represents hydrogen, chloro or trifluoromethyl.

A particularly advantageous and preferred compound is N-(2-phenylcyclopropyl)formamide.

By the term "lower alkyl" where used herein alone or in combination with other terms, groups having from 1–4, preferably 1–2, carbon atoms are indicated.

The compounds of this invention may be present as cis-trans isomers due to the geometrical arrangement of the phenyl and the amino moieties with respect to the cyclopropane ring and further as d,l optical isomers. It is intended to include in this invention all of these isomers, the separated cis and trans isomers and the resolved d- or l-isomers as well as the mixtures of these isomers. At present the trans isomers appear to possess particularly advantageou antidepressant and ataractic activity and are therefore preferred.

The phenylcyclopropylformamide compounds of this invention are prepared by reacting the 2-phenylcyclopropylamine with an excess of ethyl formate at elevated temperature preferably at the reflux temperature of the mixture or alternatively with an excess of acetic formic anhydride. Removal of the excess ethyl formate or acetic formic anhydride and purification of the residue by recrystallization from a suitable solvent such as toluene, petroleum ether or hexane gives the desired formamide.

The phenylcyclopropylamine intermediates are either known to the art or are prepared as follows:

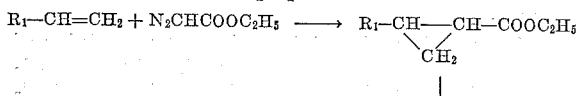

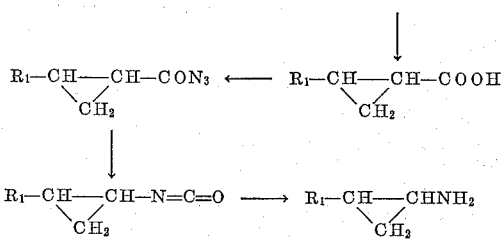

The styrene is condensed with ethyl diazoacetate to give an ethyl 2-phenylcyclopropanecarboxylate which can be fractionally distilled to separate the cis and trans isomeric carboxylates. The carboxylates are saponified by refluxing with an aqueous alcoholic solution of an alkali metal hydroxide such as potassium or sodium hydroxide to give the corresponding carboxylic acids. Alternatively, the isomeric mixture of carboxylates can be saponified as above to give a mixture of carboxylic acids which can be then separated into the cis and trans isomers by fractional crystallization.

An advantageous method for the stereospecific conversion of phenylcyclopropane carboxylic acids to corresponding isocyanates is to react the carboxylic acid with a lower alkyl haloformate to give the corresponding cyclopropyl mixed anhydride. The reaction is preferably carried out in the presence of an organic base preferably a tertiary amine such as triethylamine at about 0–20° C. in a mixture of water and a water miscible organic solvent such as dioxane or acetone. The mixed anhydride thus formed is treated with sodium azide to give the corresponding cyclopropyl acid azide. The azide is heated in an inert organic solvent such as toluene or xylene to give, upon removal of the solvent, the corresponding isocyanate. The isocyanate is refluxed in concentrated hydrochloric acid solution, made basic and extracted with ether to give the phenylcyclopropylamine intermediate.

Alternatively the cyclopropylcarboxylic acid is converted to the corresponding azide by treating with a chlorinating agent such as thionyl chloride or phosphorus pentachloride and treating the acid chloride with sodium azide. Another procedure to accomplish the same conversion is to esterify the cyclopropylcarboxylic acid with diazomethane in an ethereal solution. The resulting methyl ester is refluxed with hydrazine in ethanol to give the hydrazide which is diazotized with hydrochloric acid and sodium nitrite to give the azide.

The following examples are not limiting but are illustrative of compounds of this invention and the procedures for their preparation.

Example 1

A solution of 66.5 g. of trans-2-phenylcyclopropylamine in 40 ml. of ethyl formate is heated at reflux for 17 hours. Excess ethyl formate is removed in vacuo to leave, as the residue, trans-N-(2-phenylcyclopropyl)formamide, M.P. 65–66.5° C. after recrystallization from toluene.

By the same procedure using cis-2-phenylcyclopropylamine, the product is cis-N-(2-phenylcyclopropyl)formamide.

Example 2

A mixture of 15.0 g. of N-methyl-2-phenylcyclopropylamine and 100 ml. of ethyl formate is refluxed for 16 hours. Concentrating and recrystallizing the residue from toluene gives N-methyl-N-(2-phenylcyclopropyl)formamide.

Example 3

4-trifluoromethylstyrene (30.0 g.) and 35.0 g. of ethyl diazoacetate are mixed at 0° C. and the mixture gradually heated to 150° C. The reaction is maintained at this temperature for three hours and then the mixture is distilled under reduced pressure. The main fraction is collected which consists of ethyl 2-(4-trifluoromethylphenyl) cyclopropanecarboxylate.

A solution of 11.5 g. of potassium hydroxide in 12 ml. of water and 50 ml. of 95% ethanol is added to 17.6 g. of ethyl 2 - (4-trifluoromethylphenyl) cyclopropanecarboxylate. The solution is refluxed for eight hours, then concentrated, acidified with hydrochloric acid and filtered to give after fractional recrystallization the separated isomeric cis- and trans-2-(4-trifluoromethylphenyl) cyclopropanecarboxylic acids.

Trans - 2 - (4-trifluoromethylphenyl) cyclopropanecarboxylic acid is esterified with an etheral solution of diazomethane; the methyl ester converted to the acid hydrazide with 100% hydrazine hydrate in ethanol; the hydrazide diazotized and decomposed by heating in a toluene-methanol solution to give methyl N-[2-(4-trifluoromethylphenyl) cyclopropyl] carbamate; and the carbamate hydrolyzed with a saturated methanolic solution of barium hydroxide octahydrate to yield trans-2-(4-trifluoromethylphenyl) cyclopropylamine.

A mixture of 20.0 g. of trans-2-(4-trifluoromethylphenyl) cyclopropylamine and 150 ml. of acetic formic anhydride is heated at 40° C. for 17 hours, then evaporated and the residue is recrystallized from petroleum ether to give trans - N - [2-(4-trifluoromethylphenyl) cyclopropyl] formamide.

*Example 4*

4-chlorostyrene (48.5 g.) and 70.0 g. of ethyl diazoacetate are mixed carefully at 0° C. The mixture is gradualy heated to 160° C. and the exothermic reaction is maintained at this temperature by alternate heating and cooling as required. After the initial exothermic reaction is completed, the mixture is held at 160° C. for four hours. The mixture is distilled under reduced pressure and the fraction, B.P. 126–165° C. at 1–2 mm., is collected. The above fraction is redistilled through a 12″ vigreaux column to give two fractions, B.P. 121–6° C. at 0.8 mm., which is predominately cis-ethyl 2-(4-chlorophenyl) cyclopropanecarboxylate, and B.P. 136–140° C. at 0.8 mm., which is predominately trans-ethyl 2-(4-chlorophenyl) cyclopropanecarboxylate.

To 7.6 g. of trans-ethyl 2-(4-chlorophenyl)-cyclopropanecarboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The crystalline precipitate is recrystallized from boiling water to give colorless needles, M.P. 114–116° C., of trans-2-(4-chlorophenyl) cyclopropanecarboxylic acid.

A mixture of 54.0 g. of trans-2-(4-chlorophenyl)-cyclopropanecarboxylic acid and 75 ml. of thionyl chloride is allowed to stand at room temperature for 20 hours. Excess thionyl chloride is removed in vacuo, the last traces being stripped with benzene. The residue is distilled under reduced pressure to give a colorless oil, B.P. 131–133° C. at 1.4 mm., trans-2-(4-chlorophenyl) cyclopropanecarbonyl chloride.

Technical sodium azide (22.5 g.) is covered with 75 ml. of dry toluene and the mixture is heated gradually while a solution of 18.0 g. of trans-2-(4-chlorophenyl) cyclopropanecarbonyl chloride in 75 ml. of dry toluene is added slowly over a period of 15 minutes. The mixture is refluxed for three hours, cooled, and the precipitated salts are filtered. The filtrate is evaporated in vacuo to leave the isocyanate as a red oil. The isocyanate (15.0 g.) is heated with 50 ml. of concentrated hydrochloric acid to give trans-2-(4-chlorophenyl) cyclopropylamine. Refluxing 12.0 g. of trans-2-(4-chlorophenyl) cyclopropylamine with an excess of ethyl formate and working up as in Example 1 gives trans-N-[2-(4-chlorophenyl) cyclopropyl] formamide.

*Example 5*

A mixture of 5.0 g. of 2-(2,5-dichlorophenyl) cyclopropylamine, prepared as in Example 4 from 2,5-dichlorostyrene, and 60 ml. of ethyl formate is refluxed for 15 hours to give, after evaporation of the excess ethyl formate in vacuo and recrystallization of the residue from petroleum ether, N-[2-(2,5-dichlorophenyl) cyclopropyl] formamide.

*Example 6*

A mixture of 10.0 g. of 2-(4-fluorophenyl) cyclopropylamine (prepared by substituting 4-fluorostyrene for 4-chlorostyrene in the process of Example 4) and 100 ml. of ethyl formate is heated at reflux for 16 hours. Evaporation of the excess ethyl formate and recrystallization of the residue gives N-[2-(4-fluorophenyl) cyclopropyl] formamide.

*Example 7*

A mixture of 9.0 g. of 2-(2-methoxyphenyl) cyclopropylamine, prepared as in Example 4 from 2-methoxystyrene, and 100 ml. of ethyl formate is heated at reflux for 18 hours to give N-[2-(2-methoxyphenyl) cyclopropyl] formamide.

*Example 8*

A mixture of 4.5 g. of 2-(3-tolyl) cyclopropylamine (prepared as in Example 3 from 3-methylstyrene) and 50 ml. of ethyl formate is refluxed for 16 hours. Working up as in Example 1 gives N-[2-(3-tolyl) cyclopropyl] formamide.

*Example 9*

A mixture of 16.1 g. of 2-(2,4-xylyl) cyclopropylamine (prepared as in Example 3 from 2,4-dimethylstyrene), 13.7 g. of n-butyl bromide, 4.2 g. of sodium amide and 50 ml. of toluene is heated at reflux for six hours. After addition of water to the reaction mixture, the organic layer is separated and extracted with dilute hydrochloric acid. The acid extracts are neutralized and extracted with benzene. Removing the benzene in vacuo gives N-butyl-2-(2,4-xylyl) cyclopropylamine.

Refluxing 10.0 g. of N-butyl-2-(2,4-xylyl) cyclopropylamine with an excess of ethyl formate and working up as in Example 1 gives N-butyl-N-[2-(2,4-xylyl) cyclopropyl] formamide.

*Example 10*

A mixture of 18.9 g. of 2-(4-butylphenyl) cyclopropylamine (prepared as in Example 3 from 4-butylstyrene), 11.0 g. of ethyl bromide, 4.2 g. of sodium amide and 100 ml. of xylene is refluxed for five hours. Working up as in Example 9 gives N-ethyl-2-(4-butylphenyl) cyclopropylamine.

A mixture of 8.0 g. of N-ethyl-2-(4-butylphenyl) cyclopropylamine and 75 ml. of ethyl formate is refluxed for 16 hours to give after working up as in Example 1 N-ethyl-N-[2-(4-butylphenyl) cyclopropyl] formamide.

*Example 11*

Ethyl formate (50 ml.) and 2-(3,4-dichlorophenyl) cyclopropylamine (4.5 g.), prepared as in Example 4 from 3,4-dichlorostyrene, is heated at reflux for 18 hours. Removing the excess ethyl formate in vacuo and recrystallizing the residue gives N-[2-(3,4-dichlorophenyl) cyclopropyl] formamide.

What is claimed is:

1. A compound of the formula:

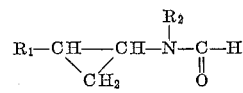

in which:

$R_1$ is a member selected from the group consisting of phenyl, chlorophenyl, fluorophenyl, trifluoromethylphenyl, lower alkylphenyl, dichlorophenyl and di-lower alkylphenyl and $R_2$ is selected from the group consisting of hydrogen and lower alkyl.
2. Trans-N-(2-phenylcyclopropyl)formamide.
3. A compound of the formula:
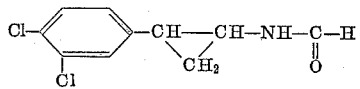
References Cited by the Examiner
UNITED STATES PATENTS
2,948,736  8/60  Martin _____ 260—562 X
3,051,722  8/62  Biel _____ 260—319
WALTER A. MODANCE, *Primary Examiner.*
NICHOLAS RIZZO, *Examiner.*